US005884864A

United States Patent [19]

Sunne et al.

[11] Patent Number: 5,884,864

[45] Date of Patent: Mar. 23, 1999

[54] VEHICLE HAVING A CERAMIC RADOME AFFIXED THERETO BY A COMPLIANT METALLIC TRANSITION ELEMENT

[75] Inventors: Wayne Sunne; Oscar Ohanian; Edward Liguori; Michael Kevershan; James Samonte; James Dolan, all of Tucson, Ariz.

[73] Assignee: Raytheon Company, Lexington, Mass.

[21] Appl. No.: 710,051

[22] Filed: Sep. 10, 1996

[51] Int. Cl.[6] .......... B64C 1/14

[52] U.S. Cl. .......... 244/121; 244/131; 438/606; 75/134 N; 228/124.5

[58] Field of Search .......... 244/129.3, 121, 244/131, 133; 428/606, 432; 343/872; 75/134 N; 285/124.5

[56] References Cited

U.S. PATENT DOCUMENTS

| | | | |
|---|---|---|---|
| 2,784,926 | 3/1957 | Bonza et al. | 244/129.3 |
| 4,201,577 | 5/1980 | Ingersoll et al. | 75/134 N |
| 4,520,364 | 5/1985 | Perry | 343/872 |
| 4,603,090 | 7/1986 | Mizuhara | 428/606 |
| 4,630,767 | 12/1986 | Mizuhara | 428/606 |
| 5,129,990 | 7/1992 | Binnie et al. | 244/121 |
| 5,306,656 | 4/1994 | Corbin et al. | 428/432 |
| 5,407,119 | 4/1995 | Churchill et al. | 228/124.5 |
| 5,691,736 | 11/1997 | Hunn et al. | 244/121 |

*Primary Examiner*—Galen L. Barefoot
*Attorney, Agent, or Firm*—David W. Collins; Leonard A. Alkov; Glenn H. Lenzen, Jr.

[57] ABSTRACT

A missile has a body with a substantially circular nose opening therein, and a ceramic radome sized to cover the nose opening. A compliant metallic circular transition element is disposed structurally between the radome and the body. The transition element includes an elongated compliant arm region and a crossbar region positioned adjacent to the radome such that a lower margin surface of the radome rests against an upper side of the crossbar region. A brazed butt joint is formed between the lower margin surface of the radome and the upper side of the crossbar region of the transition element. A second brazed lap joint is formed between the vehicle body and the elongated compliant arm of the transition element.

16 Claims, 3 Drawing Sheets

VEHICLE HAVING A CERAMIC RADOME AFFIXED THERETO BY A COMPLIANT METALLIC TRANSITION ELEMENT

BACKGROUND OF THE INVENTION

This invention relates to a vehicle having a ceramic radome, and, more particularly, to the attachment of the ceramic radome to the vehicle.

Outwardly looking radar, infrared, and/or visible-light sensors built into vehicles such as aircraft or missiles are usually protected by a covering termed a radome. The radome serves as a window that transmits the radiation sensed by the sensor. It also acts as a structural element that protects the sensor and carries aerodynamic loadings. In many cases, the radome protects a forward-looking sensor, so that the radome must bear large aerostructural loadings.

Where the vehicle moves relatively slowly, as in the case of helicopters, subsonic aircraft, and ground vehicles, some radomes are made of nonmetallic organic materials which have good energy transmission and low signal distortion, and can support small-to-moderate structural loadings at low-to-intermediate temperatures. For those vehicles that fly much faster, such as hypersonic aircraft or missiles flying in the Mach 3–20 range, nonmetallic organic materials are inadequate for use in radomes because aerodynamic friction heats the radome above the maximum operating temperature of the inorganic material.

In such cases, the radome is made of a ceramic material that has good elevated temperature strength and good energy transmission characteristics. Existing ceramics have the shortcoming that they are relatively brittle and easily fractured. The likelihood of fracture is increased by small surface defects in the ceramic and externally imposed stresses and strains. The ceramic radome is hermetically attached to the body of the missile, which is typically made of a metal with high-temperature strength, such as a titanium alloy.

The ceramic has a relatively low coefficient of thermal expansion ("CTE"), and the metal missile body has a relatively high CTE. When the missile body and radome are heated, the resulting CTE-mismatch strain between the radome and the missile body can greatly increase the propensity of the radome to fracture in a brittle manner, leading to failure of the sensor and failure of the missile. Such heating can occur during the joining operation, when the missile is carried on board a launch aircraft, or during service.

There is a need for an approach to the utilization of ceramic radomes in vehicles, particularly high-speed missiles, wherein the tendency to brittle fracture and radome failure is reduced. The present invention fulfills this need, and further provides related advantages.

SUMMARY OF THE INVENTION

The present invention provides a vehicle, such as a missile, having a ceramic radome affixed to the vehicle body. The attachment structure is such that the thermally induced strain in the radome due to thermal expansion coefficient differences is reduced or avoided. The attachment structure itself does not tend to cause premature failure in the ceramic material, as has been the case for some prior attachment approaches. The attachment may be hermetic if desired, so that the delicate sensor is protected against external environmental influences, as well as aerodynamic and aerothermal loadings.

In accordance with the invention, a vehicle having a ceramic radome comprises a vehicle body having an opening therein, a ceramic radome sized to cover the opening of the vehicle body, and an attachment structure joining the radome to the vehicle body to cover the opening. The attachment structure comprises a compliant metallic transition element disposed structurally between the radome and the body, a first attachment between the radome and the transition element, and a second attachment between the vehicle body and the transition element. In the preferred case, the vehicle is a missile with a circular nose opening, and the radome is made of sapphire, a form of aluminum oxide.

The transition element, which is in the form of a ring for the preferred case of the circular nose opening, includes an elongated compliant arm region, a crossbar region positioned adjacent to the radome such that a lower margin surface of the radome rests against an upper side of the crossbar region, and, optionally, a centering lip extending upwardly from an inside end of the crossbar region toward the radome and adjacent to the inside surface of the radome. The centering lip serves to align the radome but does not enter into the attachment function. A brazed butt joint, preferably made of an active brazing alloy, lies between the lower margin surface of the radome and the upper side of the crossbar region of the transition element, but there is no braze joint between the centering lip and the surface of the radome. A brazed lap joint lies between the vehicle body and the elongated compliant arm of the transition element.

The transition element flexes outwardly and inwardly to accommodate thermal coefficient mismatch strains, which result from heating of the vehicle body and radome during processing and service. The continuous transition element structure and brazed attachments provide a hermetic, strong, and compliant support for the radome. The crossbar of the generally T-shaped (in cross section) transition element is brazed to the lower margin surface of the sapphire radome in a butt joint, rather than a lap or shear joint.

Lap joints are often used for joining structural elements in other applications, because they spread structural loadings over large areas to reduce the incidence of joint failures. However, the lap joint has the undesirable effect of reducing the side-look angle of the sensor. For a sapphire radome having a crystallographic c-axis lying generally perpendicular to the lower margin surface of the radome, a lap joint made to the sides of the radome may induce premature cracking and failure of the sapphire material.

In the present approach, a carefully made butt joint between the lower margin surface of the ceramic radome and the crossbar region of the transition element provides a strong, hermetic structural bond. The butt joint is preferably made by brazing, most preferably with an active braze material.

The present approach provides an attachment of the ceramic radome to the vehicle body that is strong and hermetic, and minimizes the effects of thermal expansion coefficient mismatches. The attachment approach does not weaken the ceramic material. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
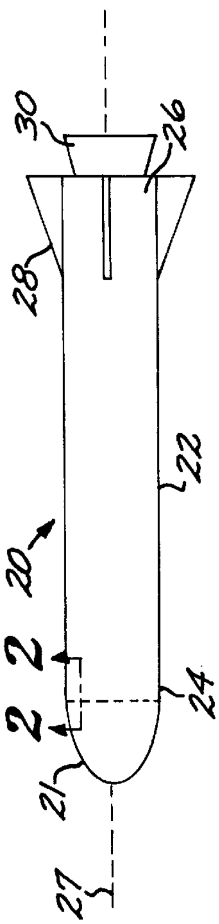
FIG. 1 is an elevational view of a missile with an attached radome.

FIG. 1 depicts a vehicle, here illustrated as a missile 20, having a radome 21 attached thereto. The radome 21 is forwardly facing as the missile flies and is therefore provided with a generally ogival shape that achieves a compromise between good aerodynamic properties and good radiation transmission properties. The missile 20 has a missile body 22 with a forward end 24, a rearward end 26, and a body axis 27. The missile body 22 is generally cylindrical, but it need not be perfectly so. Movable control fins 28 and an engine 30 (a rearward portion of which is visible in FIG. 1) are supported on the missile body 22. Inside the body of the missile are additional components that are not visible in FIG. 1, are well known in the art, and whose detailed construction are not pertinent to the present invention, including, for example, a seeker having a sensor, a guidance controller, motors for moving the control fins, a warhead, and a supply of fuel.

Figure 2:
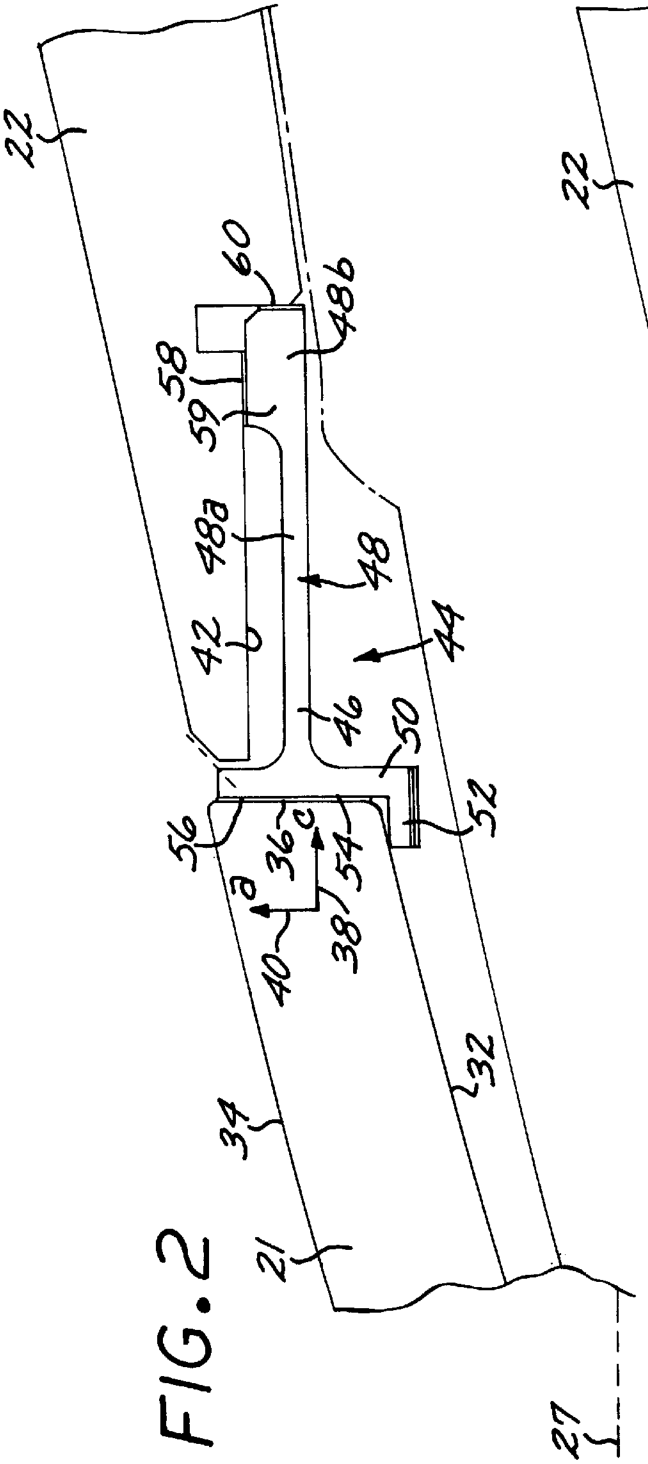
FIG. 2 is a schematic enlarged sectional view of the missile of FIG. 1, taken along line 2—2 in a radome attachment region.

FIG. 2 illustrates a region at the forward end 24 of the missile body 22, where the radome 21 attaches to the missile body 22. The radome 21 has an inside surface 32, an outside surface 34, and a lower margin surface 36 extending between the inner surface 32 and the outer surface 34. The lower margin surface 36 is generally perpendicular to the body axis 27. The radome 21 is made of a ceramic material. Preferably, the radome 21 is made of sapphire, a form of aluminum oxide. For structural reasons, the radome 21 is preferably fabricated with a crystallographic c-axis 38 of the sapphire generally (but not necessarily exactly) perpendicular to the margin surface 36. Thus, in the region of the radome 21 near to the margin surface 36, the crystallographic a-axis 40 of the sapphire is generally (but not necessarily exactly) perpendicular to the inner surface 32 and to the outer surface 34.

The most forward end of the missile body 22 defines a nose opening 42, which in this case is substantially circular because the missile body is generally cylindrical. An attachment structure 44 joins the radome 21 to the missile body 22 in order to cover and enclose the opening 42. The attachment structure includes a compliant metallic transition element 46 ("TE"). The transition element 46 has the form of a ring that extends around the entire opening 42, but is shown in section in FIG. 2.

In section, the transition element 46 has an irregular T-shape. An elongated compliant arm region 48 extends generally parallel to the body axis 27 of the missile 20. The arm region includes a free portion 48*a* and a bonded portion 48*b*. A crossbar region 50 is perpendicular to the arm region 48 and thence generally perpendicular to the body axis 27. Optionally but preferably, a centering lip 52 extends from one end of the crossbar region 50, here the end adjacent to the inside surface 32 of the radome 21, upwardly toward the radome 21 and adjacent to the inside surface 32 of the radome 21. When the radome 21 is assembled to the body 22 and the transition element 46, the centering lip 52 positions the radome exactly in a symmetrical position. The arm region 48 and the crossbar region 50 preferably extend completely around the circumference of the ring of the transition element 46. The centering lip 52 may be either continuous or discontinuous in the form of short tabs.

The radome 21 is joined to the transition element 46 at a first attachment. The first attachment is preferably a brazed butt joint 54 between an upper surface 56 of the crossbar region 50 of the transition element 46 and the lower margin surface 36 of the ceramic radome 21. The brazed butt joint 54 is preferably formed using an active brazing alloy which chemically reacts with the material of the radome 21 during the brazing operation.

In forming this butt joint 54, care is taken that the brazing alloy contacts only the lower margin surface 36 of the radome 21, and not its inside surface 32 or its outside surface 34. There is no brazed bond formed between the centering lip 52 and the radome 21. The molten form of the active brazing alloy used to form the butt joint 54 can damage the inside surface 32 and the outside surface 34 of the radome, which lie perpendicular to the crystallographic a-axis 40 of the sapphire material. The lower margin surface 36, which lies perpendicular to the crystallographic c-axis 38 of the sapphire material, is much more resistant to damage by the active brazing alloy. The use of the butt joint only to the lower margin surface 36 of the sapphire radome thus minimizes damage to the sapphire material induced by the attachment approach.

The use of a butt joint to join the radome to the transition element is to be contrasted with the more common approach for forming joints of two structures, a lap or shear joint. In this case, the lap joint would be undesirable for two reasons. The first, as discussed in the preceding paragraph, is that the lap joint would necessarily cause contact of the brazing alloy to the inside and/or outside surfaces of the radome, which are more sensitive to damage by the molten brazing alloy. The second is that the lap or shear joint would extend a distance upwardly along the inside or outside surface of the radome, reducing the side-viewing angle for the sensor that is located within the radome. That is, the further the opaque lap joint would extend along the surface of the radome, the less viewing angle would be available for the sensor. In some applications, this reduction of the side-viewing angle would be critical.

The transition element 46 is joined to the opening 42 of the missile body 21 at a second attachment. The second attachment includes a brazed lap joint 58 between a boss 59 on the bonded portion 48*b* of the arm region 48 and the material on the surface of the opening 42 of the missile body 22. A lap joint may be used in this second attachment, because there is no concern with damage to the ceramic, because neither the arm region 48 nor the missile body 22 is ceramic material. Additionally, there is no concern with side-side viewing angle at this geometric position. The second attachment also preferably includes a brazed joint 60 between an end of the bonded portion 48*b* of the arm region 48 and the opening 42. The brazed lap joint 58 and the joint 60 are formed using either an active brazing alloy or a non-active brazing alloy.

The missile body 22 is preferably made of a metal such as a titanium alloy. The titanium alloy of the missile body 22 and the sapphire of the radome 21 have different coefficients of thermal expansion (CTE). When the missile 20 is heated and cooled during fabrication or service, this difference in thermal expansion coefficients causes the total expansion of the radome 21 and the missile body 22 to be different. This difference would ordinarily produce thermally induced stresses in the radome and the missile body. The thermally induced stresses have relatively small effects on the metallic missile body structure, but they can produce significant damage and reduction in failure stress in the ceramic material of the radome 21. The present approach of the transition element avoids or minimizes such thermally induced stresses.

The transition element 46 is made of a metal or metallic alloy. The free portion 48*a* of the arm region 48 is made relatively thin, so that it can bend and flex to accommodate differences in the coefficients of thermal expansion of the missile body 22 and the radome 21. Stated alternatively, the thermally induced stresses are introduced into the free portion of the arm region 48 of the transition element 46 and not into the radome 21.

The length of the lap joint 58 is made relatively short, so as to leave a long free length of the arm region 48 to flex. If brazing material that forms the lap joint 58 should bridge over to the free portion 48*a* of the arm region 48 and affix it to the opening 42, the flexing function of the free portion 48*a* of the arm region 48 would be inhibited or lost.

Figure 3:
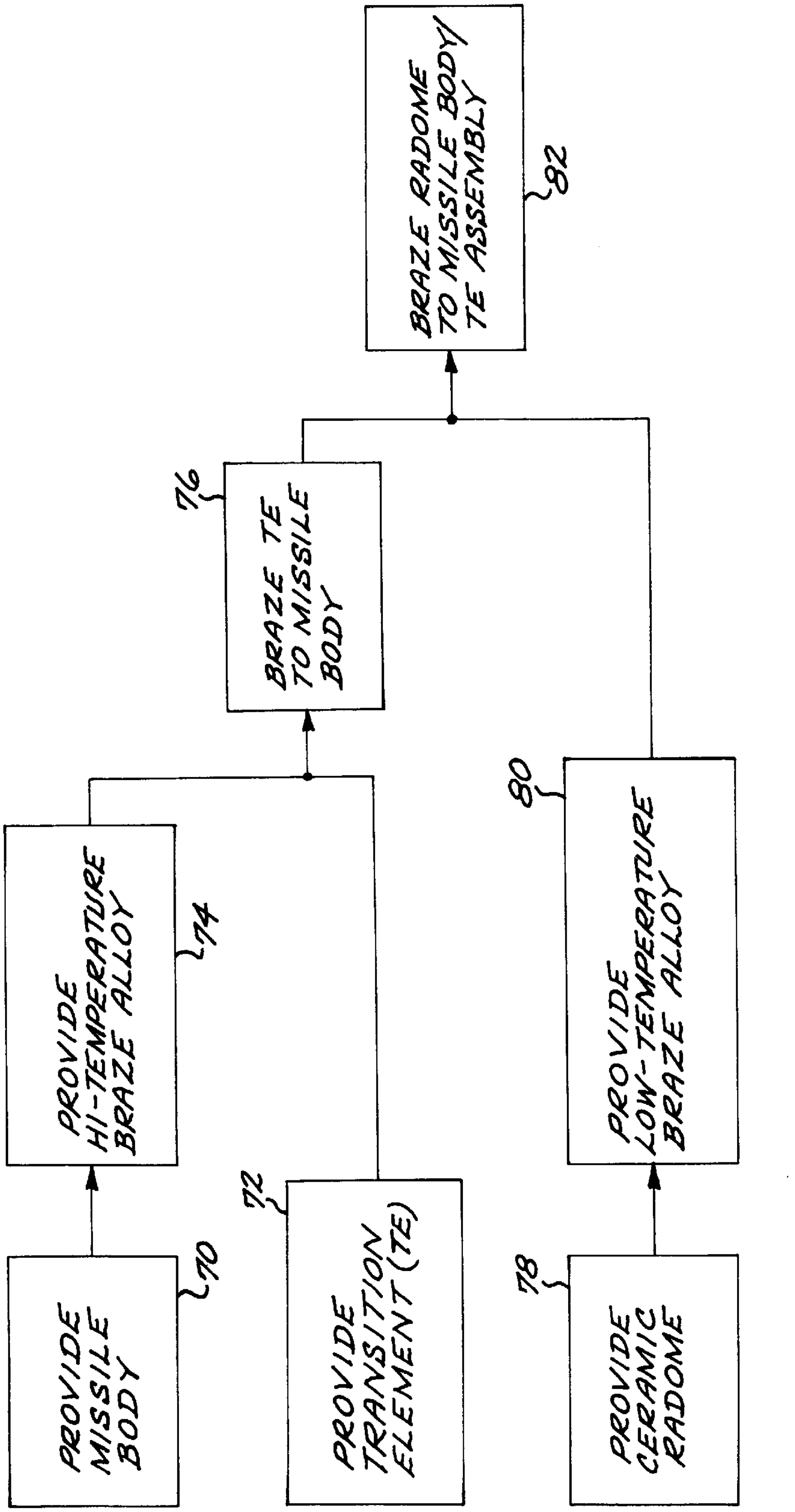
FIG. 3 is a block flow diagram for a method of preparing the missile of FIGS. 1 and 2.

FIG. 3 depicts an approach for fabricating the missile 20 having the radome 21 joined to the missile body 22. The missile body 22 is provided, numeral 70, and the transition element 46 is provided, numeral 72. The portion of the missile body 22 that forms the opening 42 is preferably a titanium alloy such as Ti-6A1-4V, having a composition, in weight percent, of 6 percent aluminum, 4 percent vanadium, balance titanium. The transition element 46 is preferably a niobium-based alloy having a composition, in weight percent, of 1 percent zirconium, balance niobium. Other metallic materials may be used for the transition element, such as, for example, tantalum, tantalum-tungsten, or kovar. The niobium-based alloy is preferred because it is readily available, is easily machined, and has a coefficient of thermal expansion relatively close to that of the preferred radome material, sapphire.

A high-temperature braze alloy to braze the bonded portion 48*b* of the arm region 48 of the transition element 46 to the missile body 22 is provided, numeral 74. The braze alloy is chosen to be compatible with the materials of the missile body and the transition element. In the preferred case, the braze alloy is preferably Gapasil 9, a non-active braze alloy having a composition, in weight percent of about 82 percent silver, about 9 percent palladium, and about 9 percent gallium, and having a brazing temperature of about 1700° F.

Figure 4:
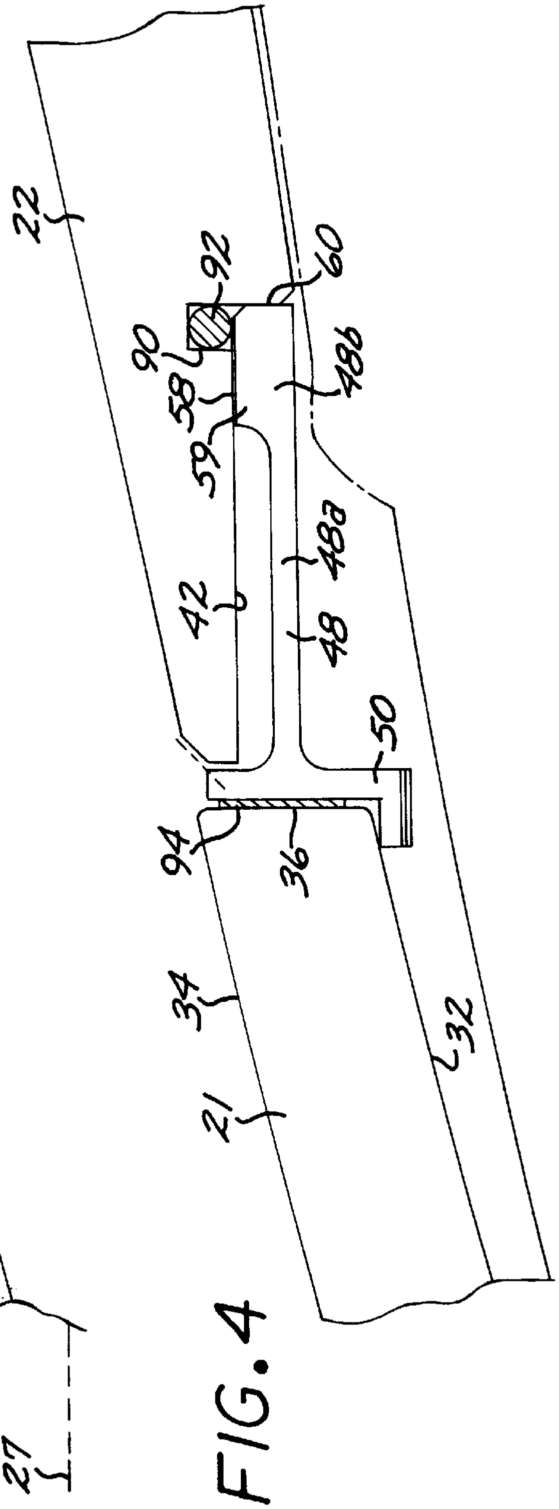
FIG. 4 is a schematic enlarged sectional view like FIG. 2, showing the positioning of the braze alloy pieces.

To facilitate the brazing operation, the missile body 22 has a circumferential recess 90 positioned adjacent to and between the locations where the lap joint 58 and the joint 60 are to be formed, see FIG. 4. The braze alloy is provided in the form of a braze alloy ring 92 that is received into the recess 90. The brazing is accomplished by heating the missile body 22 and the transition element 46, with the braze alloy ring 92 therebetween (but without the radome 21 assembled to the transition element), to a brazing temperature sufficient to melt the braze alloy and cause it to flow freely, about 1700° F., numeral 76. The brazing is accomplished in a vacuum of about $10^{-6}$ atmosphere or less and with a temperature cycle involving a ramping up from room temperature to the brazing temperature of about 1700° F., a hold at the brazing temperature for 15 minutes, and a ramping down to ambient temperature, the total cycle time being about 6 hours. Upon heating, the brazing alloy melts and flows into the regions 58 and 60. The temperature is thereafter reduced to below the melting temperature of the braze alloy, so that the flowed braze alloy solidifies and bonds the bonded portion 48*b* of the arm 48 of the transition element 46 to the missile body 22.

The ceramic radome 21, preferably made of sapphire, is provided, numeral 78. A low temperature braze alloy to braze the radome to the crossbar region 50 of the transition element 46 is provided, numeral 80. The low-temperature braze alloy is chosen to be compatible with the materials of the radome and the transition element. Brazing to a ceramic element is not readily performed with a non-active braze alloy, and therefore an active braze alloy is used. The active braze alloy contains a reactive element, such as titanium, that chemically reacts with the ceramic material, in this case sapphire. Most preferably, the braze alloy is Incusil aba, a braze alloy having a composition, in weight percent, of about 27.25 percent copper, about 12.5 percent indium, about 1.25 percent titanium, balance silver, and having a brazing temperature of about 1300° F.

As noted previously, it is highly desirable that the braze alloy not contact the inside surface 32 or the outside surface 34 of the radome 21, and that the braze alloy only contact the margin surface 36. To achieve this end, the braze alloy is provided in the form of a flat washer 94 that fits between the margin surface 36 and the crossbar region 50 of the transition element 46, see FIG. 4. The volume of the braze element washer 94 is chosen so that, upon melting, the braze material just fills the region between the margin surface 36 and the crossbar region 50. There is no excess braze alloy to flow onto the surfaces 32 and 34.

The radome 21 is assembled to the transition element 46 (previously bonded to the missile body 22), with the braze alloy washer 94 therebetween. The centering lip 52, where provided, serves as a centering guide. The assembly is heated to a temperature sufficient to melt the brazing alloy, about 1300° F., numeral 82. The brazing is accomplished in a vacuum of about $10^{-6}$ atmosphere or less and with a temperature cycle involving a ramping up from room temperature to the brazing temperature of about 1300° F., a hold at the brazing temperature for 15 minutes, and a ramping down to ambient temperature, the total cycle time being about 6 hours. Upon heating, the brazing alloy melts and flows into the butt joint region 54. The temperature is thereafter reduced to below the melting temperature of the braze alloy, so that the flowed braze alloy solidifies and bonds the radome 21 to the crossbar region 50 of the transition element 46. The brazing temperature of the step 82 is less than the brazing temperature of the step 76, so that the second brazing in step 82 does not cause debonding of the previously brazed missile body 22 and transition element 46.

The joints 54, 58, and 60 are all preferably braze joints, as illustrated. The braze joints are preferred because they form a hermetic seal for the attachment structure 44. The hermetic seal prevents atmospheric contaminants from penetrating into the interior of the missile body during storage. It also prevents gasses and particulate material from penetrating into the interior of the missile body during service. Other operable joint structures and joining techniques may be used.

Figure 5:
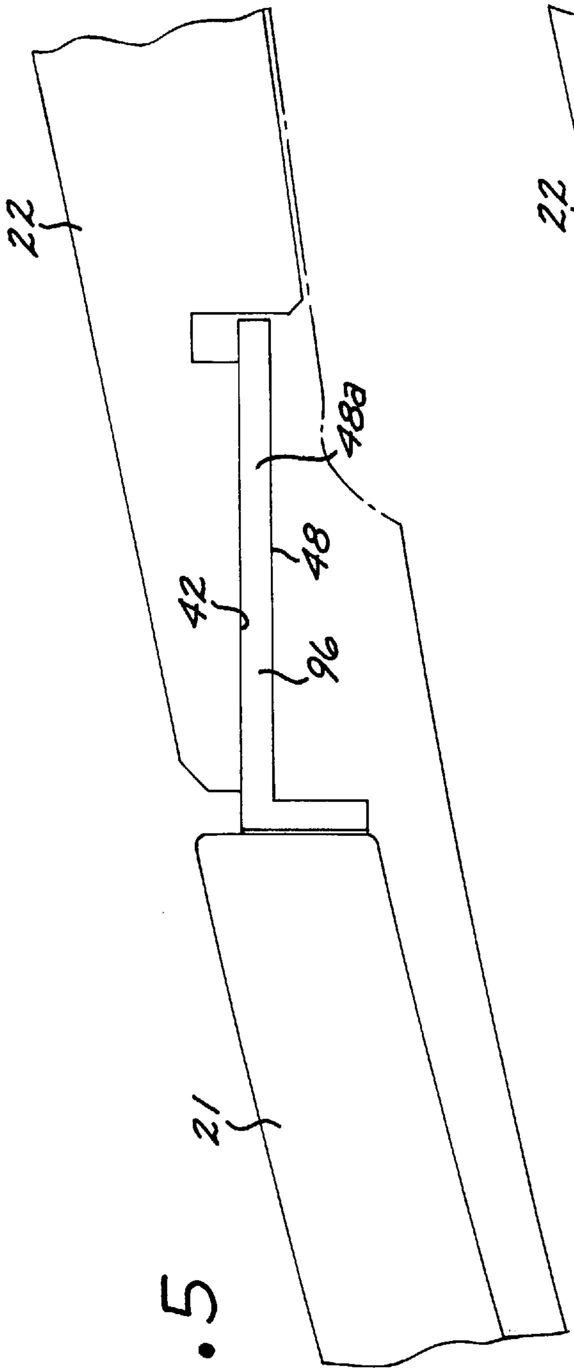
FIG. 5 is an elevational view of the radome attachment region with an "L" form of the transition element.
Figure 6:
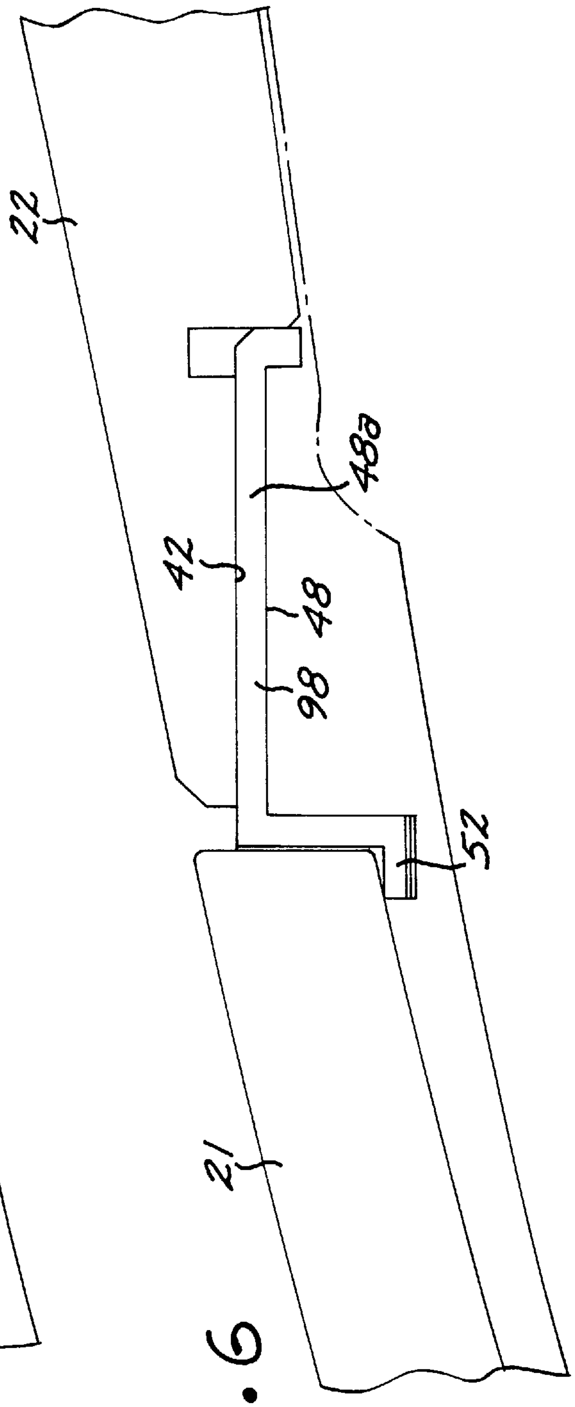
FIG. 6 is an elevational view of the radome attachment region with a "C" form of the transition element.

FIGS. 5 and 6 illustrate two other configurations of the transition element which, while operable, are less preferred than that of FIG. 2. An “L” shaped transition element 96 is illustrated in FIG. 5, and a “C” shaped transition element 98 is illustrated in FIG. 6. These transition elements 96 and 98 are positioned in a manner similar to the transition element 46 of FIG. 2, between the opening 42 of the missile body 22 and the radome 21. The principal difference between the transition elements 96 and 98, on the one hand, and the transition element 46, on the other, is that the free portion 48*a* of the arm region 48 of the transition elements 96 and 98 is positioned much closer to the opening 42. It is therefore less reproducible and more difficult to achieve a brazed joint along only a short bonded region of the arm 48 than with the configuration of FIG. 2, so that there is an unbonded free portion 48_a_ of the arm 48 to accommodate thermal expansion strains. However, with care such brazing can be accomplished. The "L" shaped transition element 96 of FIG. 5 is illustrated with no centering lip. Any of the transition elements may be formed with or without the centering lip, although the use of the centering lip is preferred.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A vehicle having a ceramic radome, comprising:

a vehicle body having an opening therein;

a ceramic radome sized to cover the opening of the vehicle body; and an attachment structure joining the radome to the vehicle body to cover the opening, the attachment structure comprising a compliant metallic transition element disposed structurally between the radome and the body, a first attachment between the radome and the transition element, the first attachment comprising a brazed joint between the transition element and the radome, and a second attachment between the vehicle body and the transition element.

2. The vehicle of claim 1, wherein the vehicle body is a nose of a missile.

3. The vehicle of claim 1, wherein the radome is made of sapphire.

4. The vehicle of claim 1, wherein the opening is substantially circular, wherein the radome has a substantially circular base sized to join to the opening, and wherein the transition element is a ring disposed between the opening and the base of the radome.

5. The vehicle of claim 1, wherein the second attachment comprises a brazed joint.

6. The vehicle of claim 1, wherein the transition element includes an elongated compliant arm region and a crossbar region, and wherein a top of the crossbar region is affixed to the radome by the first attachment and a side of the compliant arm region is affixed to the vehicle by the second attachment.

7. A vehicle having a ceramic radome, comprising:

a metallic missile body having a substantially circular nose opening therein;

a ceramic radome sized to cover the nose opening, the radome having an outside surface, an inside surface, and a lower margin surface extending between the outside surface and the inside surface;

a compliant metallic circular transition element disposed structurally between the radome and the body, wherein the transition element includes an elongated compliant arm region and a crossbar region positioned adjacent to the radome such that the lower margin surface of the radome rests against an upper side of the crossbar region;

a first brazed joint between the lower margin surface of the radome and the upper side of the crossbar region of the transition element; and a second brazed joint between the vehicle body and the elongated compliant arm of the transition element.

8. The vehicle of claim 7, wherein the radome is made of sapphire.

9. The vehicle of claim 7, wherein the radome is made of sapphire having a crystallographic c-axis oriented substantially perpendicular to the margin surface.

10. The vehicle of claim 7, wherein the transition element further includes a centering lip extending upwardly from an end of the crossbar region toward the radome, the centering lip serving to align the radome with the transition element but not being affixed to the radome.

11. The vehicle of claim 7, wherein the first brazed joint comprises an active brazing material.

12. The vehicle of claim 7, wherein the second brazed joint comprises a non-active brazing material.

13. A vehicle having a ceramic radome, comprising:

a metallic missile body having a substantially circular nose opening therein;

a sapphire radome sized to cover the nose opening, the radome having an outside surface, an inside surface, and a lower margin surface extending between the outside surface and the inside surface, the sapphire having a crystallographic c-axis oriented substantially perpendicular to the margin surface;

a compliant metallic circular transition element disposed structurally between the radome and the body, wherein the transition element includes an elongated compliant arm region, a crossbar region positioned adjacent to the radome such that the lower margin surface of the radome rests against an upper side of the crossbar region, and a centering lip extending upwardly from an inside end of the crossbar region toward the radome and adjacent to the inside surface of the radome, the centering lip serving to align the radome;

a brazed butt joint between the lower margin surface of the radome and the upper side of the crossbar region of the transition element, but not between the centering lip and the inside surface of the radome, the brazed butt joint being formed of an active brazing alloy; and a brazed lap joint between the vehicle body and the elongated compliant arm of the transition element.

14. The vehicle of claim 13, wherein the brazed butt joint is formed of an active brazing alloy having a composition, in weight percent, of about 27.25 percent copper, about 12.5 percent indium, about 1.25 percent titanium, balance silver.

15. The vehicle of claim 13, wherein the brazed lap joint is formed of a brazing alloy having a composition, in weight percent of about 82 percent silver, about 9 percent palladium, and about 9 percent gallium.

16. A method for preparing a vehicle having a ceramic radome affixed thereto, comprising the steps of:

providing a vehicle body having an opening therein;

providing a ceramic radome sized to cover the opening of the vehicle body;

providing a compliant metallic transition element having an arm region and a crossbar region lying perpendicular to the arm region; and affixing the radome to the vehicle body using the compliant metallic transition element disposed structurally between the radome and the body.

* * * * *